(12) United States Patent
Cardell et al.

(10) Patent No.: US 8,439,309 B2
(45) Date of Patent: May 14, 2013

(54) DE-ICER, A FIXTURE AND A METHOD OF ADJUSTING THE POSITION OF A DE-ICER

(75) Inventors: Per-Erik Cardell, Linköping (SE); Ragnar Lindström, Linköping (SE)

(73) Assignee: SAAB AB, Linköping (SE)

( * ) Notice: Subject to any disclaimer, the term of this patent is extended or adjusted under 35 U.S.C. 154(b) by 153 days.

(21) Appl. No.: 12/865,400

(22) PCT Filed: May 29, 2008

(86) PCT No.: PCT/SE2008/050628
§ 371 (c)(1), (2), (4) Date: Nov. 19, 2010

(87) PCT Pub. No.: WO2009/096838
PCT Pub. Date: Aug. 6, 2009

(65) Prior Publication Data
US 2011/0049301 A1 Mar. 3, 2011

Related U.S. Application Data

(60) Provisional application No. 61/025,337, filed on Feb. 1, 2008.

(51) Int. Cl.
*B64D 15/16* (2006.01)
(52) U.S. Cl.
USPC .................................. 244/134 R; 244/134 E
(58) Field of Classification Search .............. 244/134 A, 244/134 R, 134 D, 131, 132; *B64D 15/16*
See application file for complete search history.

(56) References Cited

U.S. PATENT DOCUMENTS

| | | | | |
|---|---|---|---|---|
| 1,949,007 A * | 2/1934 | Butler | ............................. | 33/533 |
| 1,988,085 A * | 1/1935 | Orlando | ........................ | 244/131 |
| 2,214,919 A * | 9/1940 | Burgess | .................... | 244/134 A |
| 2,249,940 A * | 7/1941 | Bulloch | ................... | 244/134 C |
| 2,390,093 A * | 12/1945 | Garrison | .................. | 244/134 C |
| 2,471,894 A * | 5/1949 | Pulver | ....................... | 244/134 A |
| 2,539,576 A * | 1/1951 | Gregg | ........................ | 244/134 A |
| 2,876,970 A * | 3/1959 | Halbert | ...................... | 244/134 R |
| 4,458,865 A * | 7/1984 | Sandorff | .................... | 244/134 R |
| 4,678,144 A | 7/1987 | Goehner et al. | | |
| 5,074,497 A * | 12/1991 | Phillips, II | ................. | 244/134 D |
| 5,318,253 A | 6/1994 | Levin | | |
| 5,429,327 A | 7/1995 | Adams | | |
| 5,553,815 A | 9/1996 | Adams et al. | | |
| 6,283,411 B1 | 9/2001 | Giamati et al. | | |
| 2010/0065687 A1 * | 3/2010 | Douglas | ........................ | 244/130 |

OTHER PUBLICATIONS

PCT/ISA/210—International Search Report—Jan. 19, 2009.
PCT/ISA/237—Written Opinion of the International Searching Authority—Jan. 19, 2009.

* cited by examiner

*Primary Examiner* — Philip J Bonzell
*Assistant Examiner* — Timothy Schwarz
(74) *Attorney, Agent, or Firm* — Venable LLP; Eric J. Franklin

(57) ABSTRACT

A de-icer including a bracket arranged on a structural member and a de-icer module mounted on the bracket. The de-icer module is adjustable arranged on the bracket such that a position of the de-icer module is adjustable in relation to the bracket. Also a fixture and a method of adjusting a position of a de-icer.

17 Claims, 6 Drawing Sheets

DE-ICER, A FIXTURE AND A METHOD OF ADJUSTING THE POSITION OF A DE-ICER

CROSS-REFERENCE TO RELATED APPLICATIONS

This application claims priority to U.S. provisional patent application 61/025,337 filed 1 Feb. 2008 and is the national phase under 35 U.S.C. §371 of PCT/SE2008/050628 filed 29 May 2008.

FIELD OF THE INVENTION

This invention relates to a de-icer, a fixture and a method of adjusting the position of a de-icer.

Ice on structural members of aircrafts in flight is a danger that is well known. The structural member may be an aircraft surface susceptible to icing during flight, including the leading edges of wings, stabilizers, engine inlets, rotors etc. Attempts have been made to removing ice from aircraft during flight. One method that has been used extensively is so called mechanical de-icing. In mechanical de-icing the leading edges of structural members are distorted in so manner so as to crack ice that has accumulated thereon. One mechanical de-icing technique utilizes internal inductors to "hammer" and thereby distort the leading edges of the structural member. The inductor is connected to a power source and when a high-current pulse is lead through the inductor heavy vibrations are created by a magnetic field in the inductor. The vibrations cause a hammering effect on the structure which removes the ice.

Document U.S. Pat. No. 5,429,327 discloses an electro-impulse de-icer for de-icing an aircraft structural member. The de-icer includes an inductor coil, which is disposed within an opening in the leading edge. The de-icer further includes a movable metal target disposed in proximity with the coil. The target is supported by a flexible, ice-accumulating support member that permits the target to move relative to the coil and to the structural member. The support member is rapidly, and forcefully, displaced away from the coil and the structural member upon passing a short-duration, high duration pulse through the coil. The current flow creates an electromagnetic field that induces eddy currents in the target and the support member. Upon collapse of the electromagnetic field in the coil, the target and support member are pulled rapidly to their rest position.

One drawback with the known de-icer is that an opening or recess has to be made into the skin of the structure. This may affect the strength of the structure and may also make the mounting and production of the wing structure more complicated and expensive.

Also, in U.S. Pat. No. 5,429,327 a reference is made to a prior art de-icer provided with a mounting bracket. However, a problem with such a fixed bracket is that a number of bracket of different sizes have to be mounted along the extension of the wing. Production and mounting of several brackets of different sizes will be both complicated and expensive.

Another prior art de-icer is disclosed in FIG. 1 of the present application. Two inductors are attached to a leading edge of a wing. Each inductor is mounted within the wing using a bolt which extends through the skin of the wing and through the inductor. The bolt also biases a coil spring against the inductor. When a high-current pulse is lead through the inductor heavy vibrations are created by a magnetic field which causes vibrations in the inductor. The result will be that the bolt moves in an outward direction in relation to the wing and thereby affect the skin of the wing. Also, debris will be collected between the head of the bolt and the skin.

SUMMARY OF THE INVENTION

The objective problem to be solved by the present invention is to provide a de-icer which is adapted for structural members of different size.

Another objective problem to be solved by the present invention is to provide a de-icer which is simple to assemble within a wing structure.

A further objective problem to be solved by the present invention is to provide a de-icer which remains the strength of the wing structure in which the de-icer is arranged.

Another objective problem to be solved by the present invention is to adjust a de-icer in a correct position within a wing structure.

This is achieved by a fixture for adjusting the position of a de-icer and a method of adjusting the position of a de-icer.

Since the de-icer comprises a bracket arranged on a structural member and that the position of the de-icer module is adjustable in relation to the bracket, the mounting of components, for example a skin on a structural member such as a wing for an aero-plane will be easy since the position of the de-icer module is already predetermined when mounting the skin on the wing structure. Also, only one size of brackets, or at least a very small number of different brackets, has to be used in one type of structural member, since the de-icer may be adjusted and adapted for different positions in relation to the structural member.

A fixture is used for the method of adjusting the position of the de-icer. The fixture comprises a fixture plate, distance pins arranged on the fixture plate and a guide, which is removable attached to the plate. The fixture is mounted on the de-icer when adjusting the position of the de-icer module in relation to the structural member.

The method of adjusting the position of the de-icer comprises the following steps:
  the fixture plate is arranged on the guide pins,
  the guide of the fixture is arranged to rest on ribs of a wing structure,
  the first threaded pin is locked in relation to the bracket,
  the second threaded pin is locked in relation to the adaptor plate, and
  the fixture is removed from the guide pins.

BRIEF DESCRIPTION OF THE DRAWINGS

This method gives a secure a reliable adjustment of the position of de-icer in relation to the structural member, so that the de-icing function of the de-icer is effective and reliable.

Other advantages and features of the invention can be derived from the following detailed description of exemplary embodiments of the invention, with reference to the drawings.

DETAILED DESCRIPTION OF EMBODIMENTS OF THE INVENTION

Figure 1:
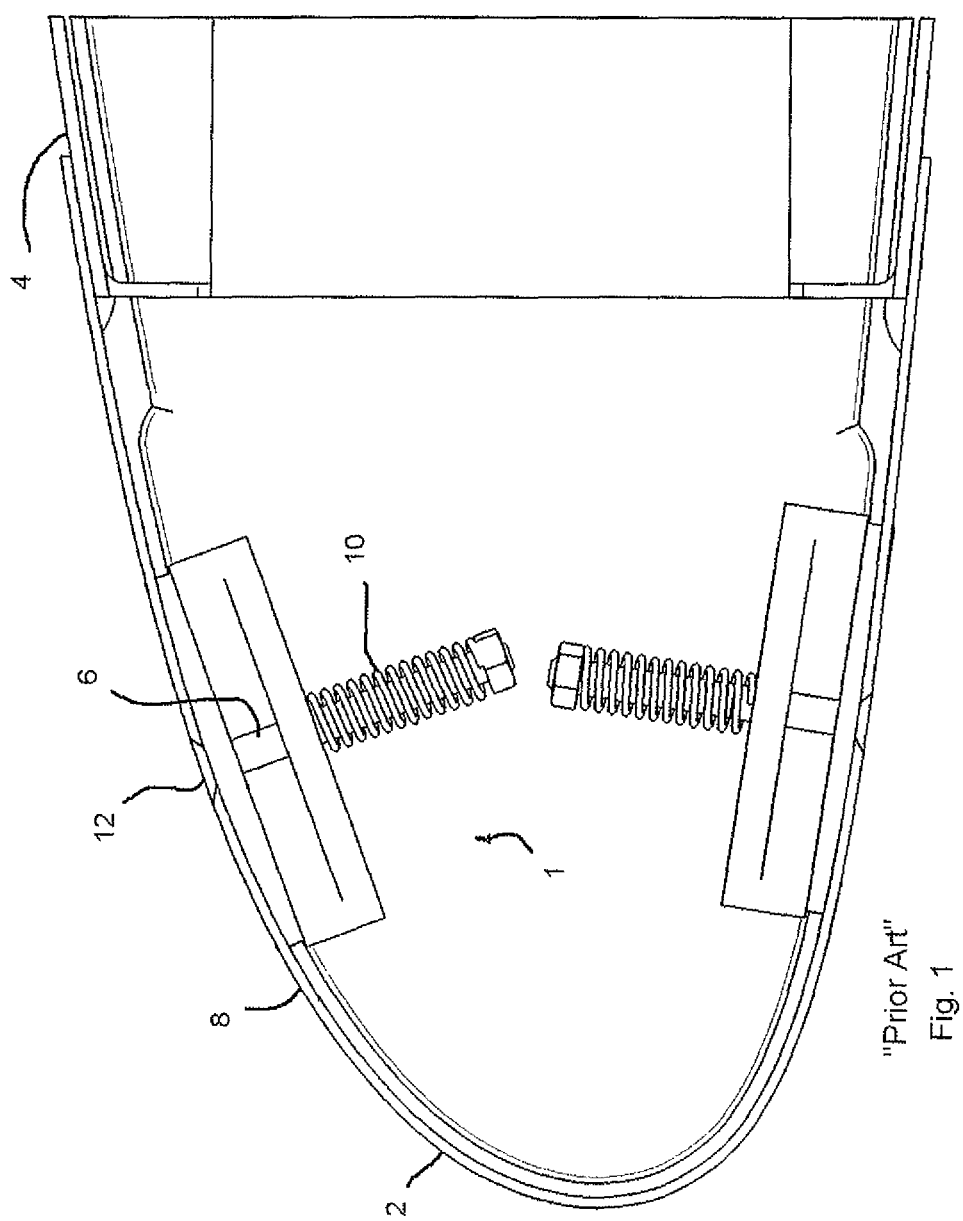
FIG. 1 is a cross-sectional view of a prior art de-icer.

FIG. 1 is a cross-sectional view of a prior art de-icer. As already mentioned above two inductors 1 are attached to a leading edge 2 of a wing 4. Each inductor 1 mounted within the wing 4 uses a bolt 6 which extends through the skin 8 of the wing 4 and through the inductor 1. The bolt 6 also biases a coil spring 10 against the inductor 1. When a high-current pulse is lead through the inductor 1 heavy vibrations are created by a magnetic field which causes vibrations in the inductor 1. This causes a "hammering" effect on the skin 8 of the wing 4. However, the drawbacks with this prior art de-icer are that the bolts 6 move outwardly in relation to the wing 4 and thereby affect the skin 8 of the wing 4. Also, debris will be collected between the head 12 of the bolt 6 and the skin 8. A further drawback is that is difficult to countersink the head 12 of the bolt 6 in the skin 8 of the wing 4, since the leading edge 2 has a curved profile. This is not acceptable in an aerodynamic view.

Figure 2:
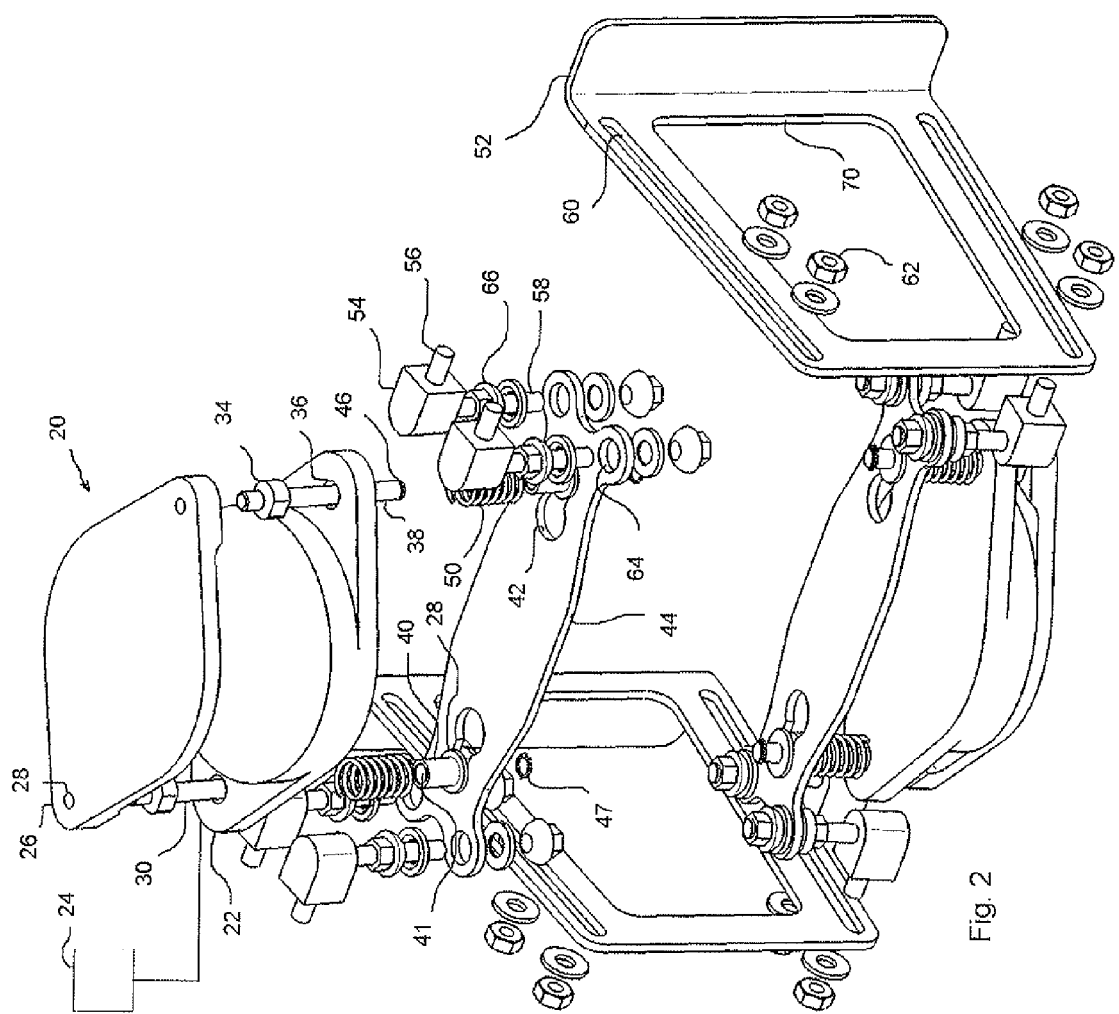
FIG. 2 is an exploded view of a preferred embodiment of a de-icer according to the invention.

FIG. 2 discloses, in an exploded view, a preferred embodiment of a de-icer 20 according to the invention. The de-icer 20 comprises a de-icer module 22. In the preferred embodiment the de-icer module 22 is an inductor 22 connected to a power source 24. The power source 24, when activated, leads a high-current pulse through the inductor 22. As a result heavy vibrations are created by a magnetic field in the inductor 22, which causes vibrations in the inductor 22. The vibrations cause a "hammering" effect on the skin 8 of the wing 4.

A doubler 26, preferably made of metal is arranged on the inductor 22 and will bear on the inner side of the skin 8 of a wing 4 for an aeroplane. The doubler 26 is provided with threaded holes 28 in which guide pins 30 with threaded ends 32 are connected and secured with a lock nut 34. The inductor 22 is also provided with holes 36 for the guide pin 30. However, the holes 36 in the inductor 22 have a diameter larger than the diameter of the guide pins 30. Therefore, the inductor 22 can move in an axial direction in relation to the guide pins 30 and also move in a direction to and from the doubler 26.

Each guide pin 30 is in the end 38 opposite to the doubler 26 held into guide sleeves 40, which guide sleeves 40 are releasable accommodated within openings 42 in an adaptor plate 44. Each guide sleeve 40 is provided with a through hole 41 for accommodation of the guide pin 30. The guide pins 30 are provided with a circumferential groove 46 in the end 38 opposite to the doubler 26. A lock ring 47 is arranged into the circumferential groove 46, so that the guide pins 30 are prevented to leave the guide sleeve 40 in a direction to the doubler 26. Preferably, the openings 42 in the adaptor plate 44 are formed like key holes, and the guide sleeves 40 are provided with double collars 48, which simplify the mounting of the guide sleeves 40 in the adaptor plate 44 by introducing the guide sleeve 40 in the key hole and bring the guide sleeve 40 in a transverse direction, so that the adaptor plate 44, together with the collars 48, locks the guide sleeve 40 in an axial direction.

A coil spring 50 is arranged on each guide pin 30, between the adaptor plate 44 and the inductor 22. The coil springs 50 bias the inductor 22 against the doubler 26, but the inductor 22 is able to move in relation to the guide pins 30, when the load of the vibrations from the inductor 22 overcome the force of the coil springs 50.

The adaptor plate 44 is connected to a pair of mounting brackets 52 by means of adjustment elements 54. In the embodiment disclosed in FIG. 2, four adjustment elements 54 are arranged between the adaptor plate 44 and the respective bracket 52.

Each adjustment element 54 is provided with first and second threaded pins 56, 58. The first threaded pin 56 is adapted to be fixed into an elongated slot 60 in the bracket 52, so that the pin 56 can be fixed into the slot 60 in an appropriate position by means of a nut 62. The second threaded pin 58 is adapted to be fixed into a hole 64 in the adapter plate 44. Preferably, the hole 64 has a diameter which is essentially larger than the diameter of the second threaded pin 58. As a result, the adaptor plate 44 can be fixed in different angels in relation to the adjustment element 54. For this purpose, ball nuts 66 are arranged on the second threaded pin 58. In the embodiment disclosed in FIG. 2, two de-icer modules 22 are arranged on each pair of brackets 52. When the two de-icer modules 22 are arranged in the leading edge 2 of a wing 4, ice accumulated both on the upper and lower side of the wing 4 may be removed by distorting the skin 8 of the wing 4 when activating the de-icer modules 22.

The brackets 52 are adapted to be attached to a structural member 68, such as a spare plate in a wing 4, which will be described further below. The brackets 52 are provided with apertures 70 for reasons of achieving a light weight construction.

Figure 3:
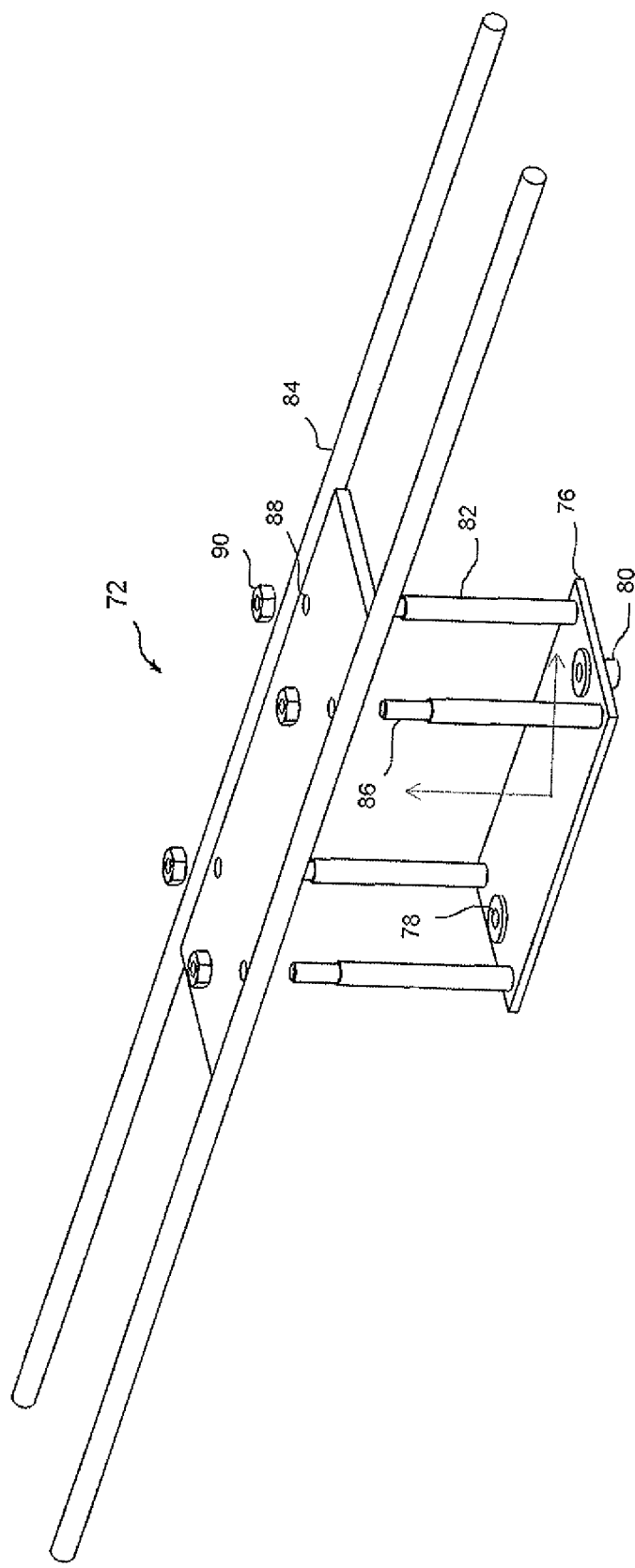
FIG. 3 is a view in perspective of a fixture for adjusting the position of a de-icer according to the invention.

FIG. 3 is a view in perspective of a fixture 72 for adjusting the position of the de-icer 20 according to the invention. The fixture 72 comprises a fixture plate 76 provided with bores 78 adapted to the guide pin 30. Bushings 80, adapted to mate with the guide pins 30, are arranged in the bores 78. The inner diameter of the bushings 80 is larger than the diameter of the guide pins 30, so that the guide pins 30 are free to move in an axial direction in relation to the bushings 80. Distance pins 82 are arranged on the fixture plate 76 and a guide 84 is removable attached to the fixture plate 76 via the distance pins 82. The removable connection between the distance pins 82 and the guide 84 is achieved by threaded ends 86 of the distance pins 82, which are adapted to fit into holes 88 arranged in the guide 84. The guide 84 is connected to the distance pins 82 by means of nuts 90. The length of the distance pins 82 is of importance when adjusting the position of the de-icer module 22, which will be described further below.

Figure 4:
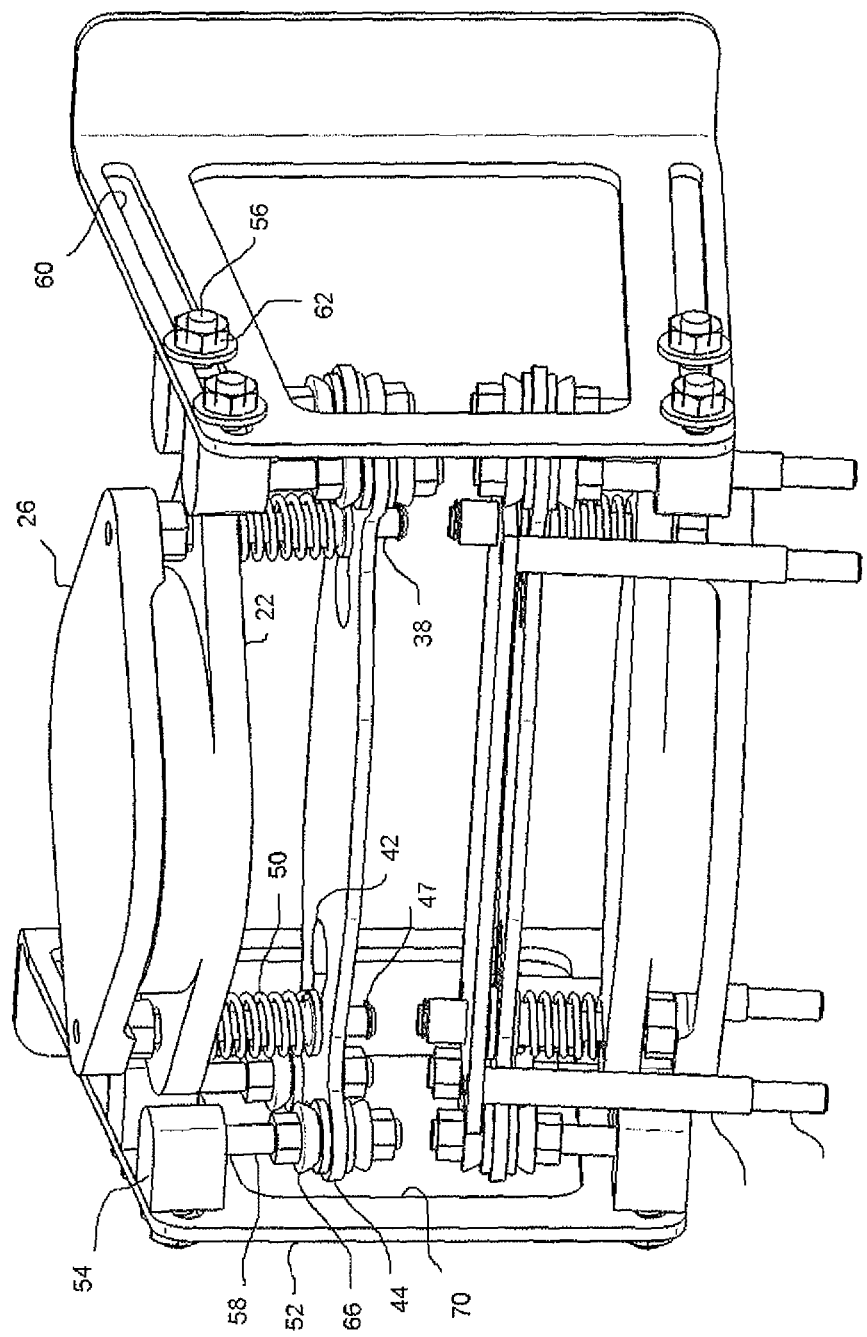
FIG. 4 is a view in perspective of the de-icer according to the invention in which the fixture is mounted for adjustment.
Figure 5:
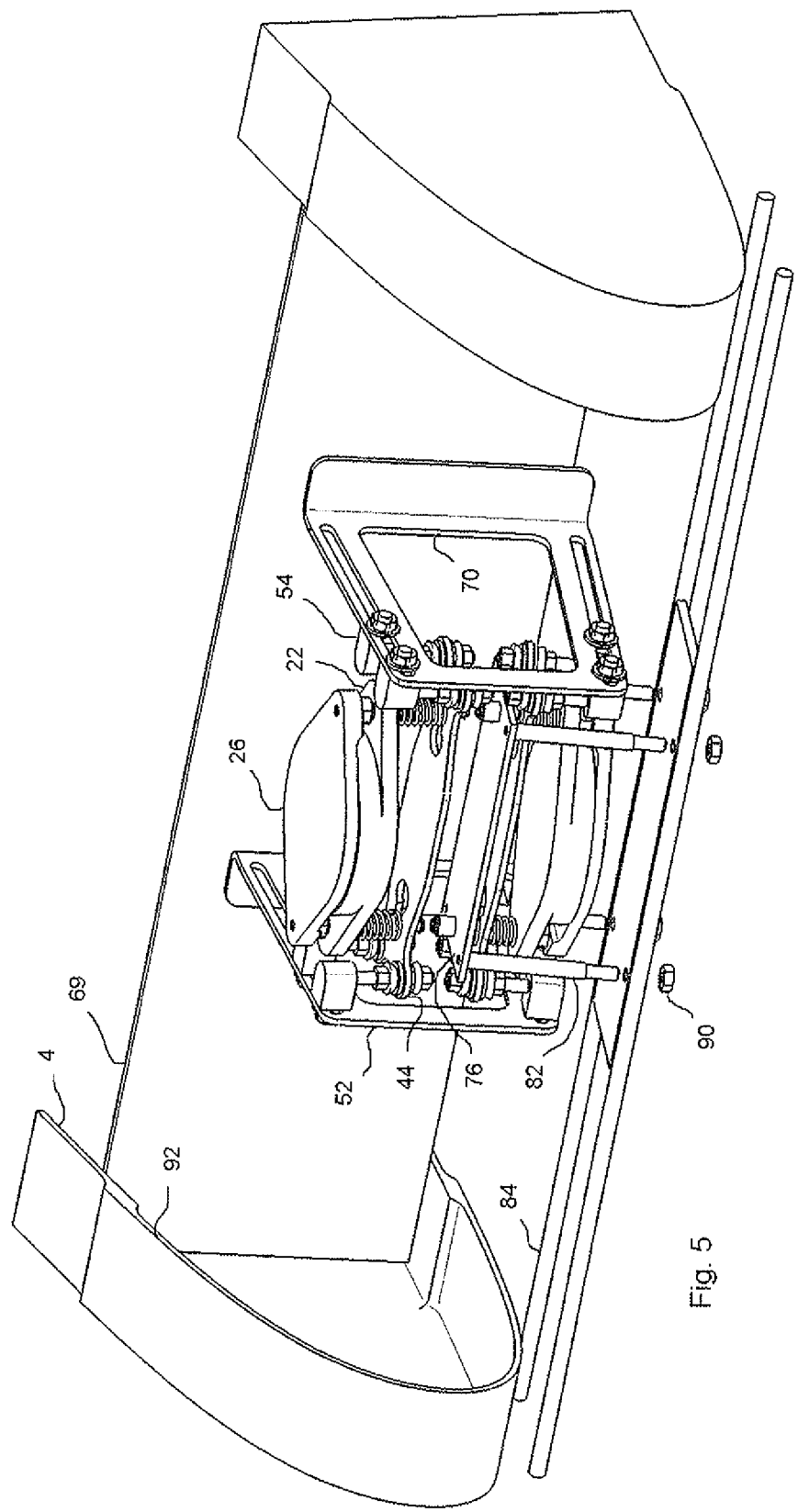
FIG. 5 is a view in perspective of the de-icer according to the invention in which the fixture is mounted for adjustment in a leading edge of a wing.
Figure 6:
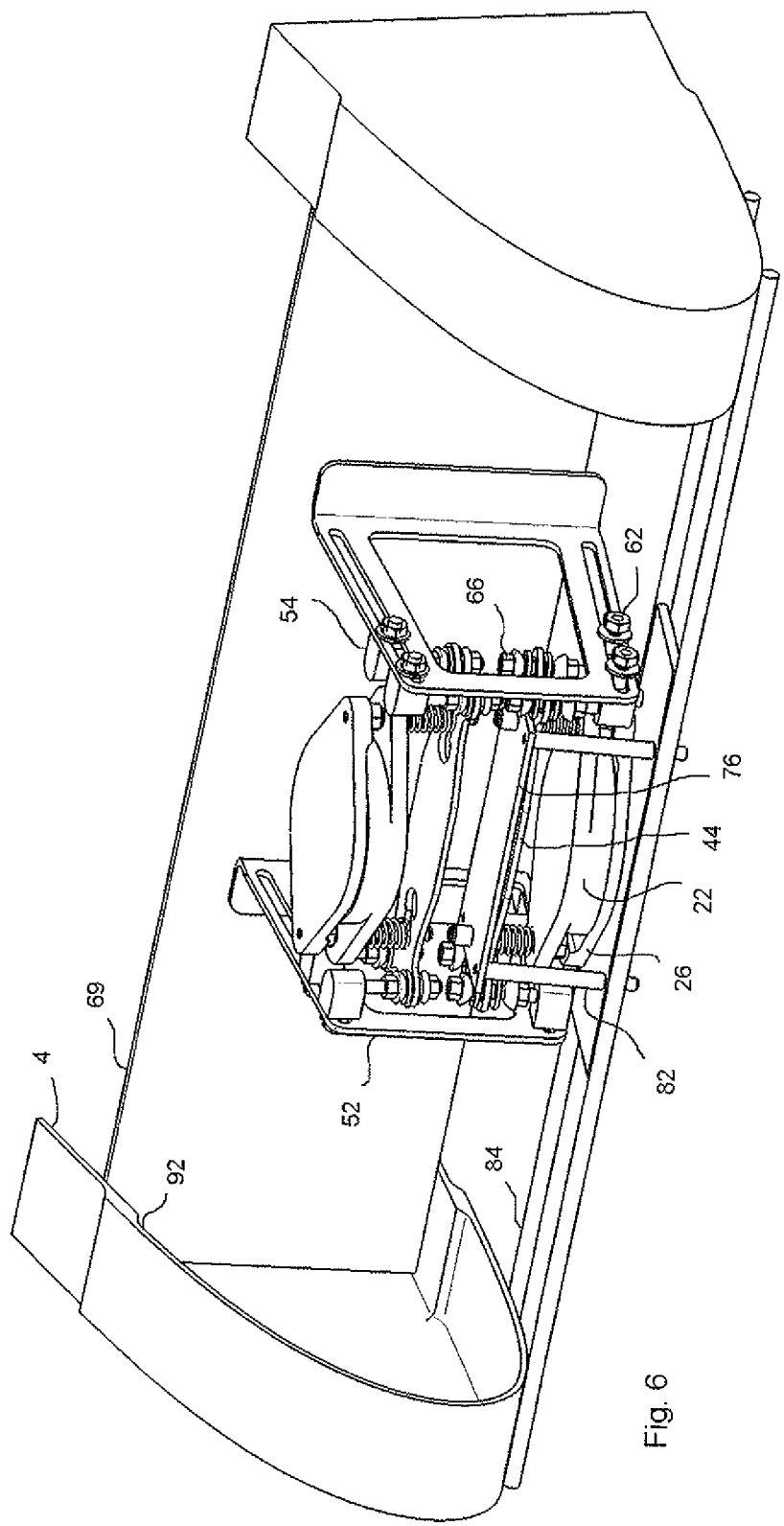
FIG. 6 is a view similar to FIG. 5 when the fixture is arranged in the correct position for adjustment of the de-icer.

FIGS. 4-6 discloses a method of adjusting the position of a de-icer 20 according to the invention. In FIG. 4 the fixture plate 76 with the distance pins 82 are mounted for adjustment of the position of the de-icer module 22 in relation to a structural member 68, such as a wing 4 for an aircraft.

First, the set of doubler 26, inductor 22 and adaptor plate 44 are pushed together, so that the guide pins 30 are pushed through the guide sleeves 40. Then, the fixture plate 76 is mounted on the guide pins 30, so that the distance pins 82 will extend on each side of the adaptor plate 44, inductor 22 and the doubler 26. Thereafter, the lock rings 47 are mounted in the circumferential grooves 46 in the guide pins 30, so that the fixture 72 is held by the guide pins 30 in a position related to the doubler 26, inductor 22 and adaptor plate 44.

In the next step, disclosed in FIG. 5, the guide 84 is mounted on the distance pins 82 by means of the nuts 90. The guide 84 has a length in relation to the longitudinal direction of the wing 4, which is adapted to the distance between ribs 92 of the wing 4.

In the final adjustment step, disclosed in FIG. 6, the position of the de-icer module 22 is adjusted by means of the adjustment elements 54, so that the guide 84 will abut the outer surface of the ribs 92. When the guide 84 abuts the outer surface of the ribs 92 the nuts 62, 66 of the first and second threaded pins 56, 58 of respective adjustment element 54 are tightened and as a result the doubler 26, inductor 22 and adaptor plate 44 have reached a preferred adjusted position. In this position the doubler 26, when removing the fixture 72 and mounting the skin 8 on the ribs 92, will abut the inside of the skin 8 with a predetermined force depending on the properties of coil spring 50 and the adjusted position of the doubler 26, inductor 22 and the adaptor plate 44 in relation to the bracket 52. This predetermined force is achieved by the length of the distance pins 82 of the fixture 72. A short length of the distance pins 82 will result in a large force of the doubler 26 on the inside of the skin 8 and a long length of the distance pins 82 will result in a large force.

Before mounting of the skin 8 on the ribs 92 the procedure for adjusting the other de-icer module 22 arranged on the same bracket 52 as the first de-icer module 22 takes place according to the same method as described above. However, depending on which surfaces on the wing 4 should be de-iced, only one de-icer module 22 may be arranged between the brackets 52.

In FIG. 6 it is disclosed how the brackets 52 are attached to the spare plate 69. The brackets 52 can be welded, glued, riveted or screwed to the spare plate 69. It is also possible to shape the brackets 52 in one piece with the spare plate 69. However, other configurations of the brackets 52 may be applied. Therefore, it may be possible to arrange only one bracket 52 to the structural member 68.

The invention claimed is:

1. A de-icer, comprising:
A bracket arranged on a structural member of a an aircraft, the bracket comprising a slot; and
An adjustment element, and;
At least one de-icer module mounted on the bracket, wherein the de-icer module is adjustably arranged on the bracket, so that position of the de-icer module is adjustable in relation to the bracket, wherein the at least one de-icer module generates vibrations, and wherein the at least one de-icer module abuts against an inside surface of a skin of the aircraft with a predetermined force; and
The adjustment element is connectably arranged between the de-icer module and the slot, and the adjustment element is slideable and lockable within said slot such that the de-icer module can be fixed at different positions in relation to the slot.

2. The de-icer according to claim 1, further comprising:
an adjustment element arranged between the de-icer module and the bracket.

3. The de-icer according to claim 1, wherein the bracket comprises a slot arranged such that the de-icer module can be fixed at different positions in relation to the slot.

4. The de-icer according to claim 3, wherein the adjustment element comprises a first threaded pin, which is arranged and lockable in the slot of the bracket.

5. The de-icer according to claim 1, further comprising:
an adaptor plate on which the de-icer module is resiliently arranged.

6. The de-icer according to claim 5, further comprising:
an adjustment element arranged between the de-icer module and the bracket, wherein the adjustment element comprises a second threaded pin, which is arranged and lockable in the adaptor plate.

7. The de-icer according to claim 6, further comprising:
a ball nut configured to fasten the second threaded pin of the adjustment element to the adaptor plate such that the adaptor plate can be fixed to the adjustment element in different positions.

8. The de-icer according to claim 5, further comprising:
a guide sleeve arranged in an opening in the adaptor plate, wherein the guide sleeve comprises a through hole for accommodation of the guide pin.

9. The de-icer according to claim 1, further comprising:
a guide pin configured to slidably connect the de-icer module to the adaptor plate.

10. The de-icer according to claim 9, further comprising:
a coil spring arranged between the de-icer module and the adaptor plate, wherein the coil spring biases the de-icer module in a direction from the adaptor plate.

11. The de-icer according to claim 1, wherein two brackets are mounted on the structural member, and wherein the de-icer module is mounted between the brackets.

12. The de-icer according to claim 11, wherein two de-icer modules are mounted between the brackets.

13. The de-icer according to claim 1, wherein the de-icer module comprises an inductor connected to a power source.

14. A fixture for adjusting the position of a de-icer comprising a bracket arranged on a structural member of an aircraft and at least one de-icer module mounted on the bracket, wherein the de-icer module is adjustably arranged on the bracket such that a position of the de-icer module is adjustable in relation to the bracket, the fixture comprising:
guide pins,
a fixture plate comprising bores adapted to the guide pins,
distance pins arranged on the fixture plate, and
a guide removably attached to the fixture plate.

15. The fixture according to claim 14, further comprising:
bushings adapted to mate with the guide pins, wherein the bushing are arranged in the bores.

16. A method of adjusting a position of a de-icer comprising a bracket arranged on a structural member of an aircraft and at least one de-icer module mounted on the bracket, wherein the de-icer module is adjustably arranged on the bracket such that a position of the de-icer module is adjustable in relation to the bracket, the method comprising:
arranging a fixture plate on guide pins,
arranging a guide of a fixture to rest on ribs of a wing,
locking a first threaded pin in relation to the bracket,
locking a second threaded pin in relation to an adaptor plate, and
removing the fixture from the guide pins.

17. A de-icer, comprising:
a bracket arranged on a structural member of an aircraft; and
at least one de-icer module mounted on the bracket, wherein the de-icer module is adjustably arranged on the bracket, so that a position of the de-icer module is adjustable in relation to the bracket;
an adaptor plate on which the at least one de-icer module is resiliently arranged;
an adjustment element arranged between the de-icer module and the bracket, wherein the adjustment element comprises a second threaded pin, which is arranged and lockable in the adaptor plate; and
a ball nut configured to fasten the second threaded pin of the adjustment element to the adaptor plate such that the adaptor plate can be fixed to the adjustment element in different positions.

* * * * *

UNITED STATES PATENT AND TRADEMARK OFFICE
CERTIFICATE OF CORRECTION

| | | |
|---|---|---|
| PATENT NO. | : 8,439,309 B2 | Page 1 of 1 |
| APPLICATION NO. | : 12/865400 | |
| DATED | : May 14, 2013 | |
| INVENTOR(S) | : Cardell et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 262 days.

Signed and Sealed this
Second Day of December, 2014

Michelle K. Lee
*Deputy Director of the United States Patent and Trademark Office*